United States Patent [19]

Wagensonner et al.

[11] 4,050,795
[45] Sept. 27, 1977

[54] MOTION PICTURE CAMERA OPERABLE BY A SINGLE OPERATING SWITCH

[75] Inventors: Eduard Wagensonner, Aschheim; Theodor Huber, Munich; Bernhard von Fischern, Ottobrunn, all of Germany

[73] Assignee: Agfa-Gevaert Aktiengesellschaft, Leverkusen, Germany

[21] Appl. No.: 663,814

[22] Filed: Mar. 4, 1976

[30] Foreign Application Priority Data

Mar. 8, 1975  Germany .............................. 2510142

[51] Int. Cl.² ............................................... G03B 7/08
[52] U.S. Cl. .................................. 352/141; 352/171; 352/178
[58] Field of Search ................ 352/141, 174, 178, 171

[56] References Cited

U.S. PATENT DOCUMENTS

| | | | |
|---|---|---|---|
| 3,275,399 | 9/1966 | Johnson | 352/141 |
| 3,391,978 | 7/1968 | Reinsch | 352/141 |
| 3,452,347 | 6/1969 | Stimson | 352/142 |

Primary Examiner—Monroe H. Hayes
Attorney, Agent, or Firm—Michael J. Striker

[57] ABSTRACT

A single operating switch replaces the main switch connecting the diaphragm control means to the battery and the release switch activating the film transport. All camera circuits are directly connected to the battery when the main operating switch is closed. An electronic switch is connected in series with the film transport motor and is closed only upon receipt of a control signal. In a first embodiment the control signal is furnished by a timing circuit after a predetermined time interval following the activation of the main operating switch. In a second embodiment the control signal is furnished by a NAND-gate which has a first input which receives a "1" signal while the diaphragm is being adjusted and a second input which receives a "1" signal while the electronic switch is open. The NAND-gate thus furnishes a "1" signal to the electronic switch causing it to be conductive at all times except when the initial adjustment of the diaphragm takes place.

11 Claims, 2 Drawing Figures

MOTION PICTURE CAMERA OPERABLE BY A SINGLE OPERATING SWITCH

BACKGROUND OF THE INVENTION

This invention relates to motion picture cameras having a battery and having electronically energized film transport means as well as a diaphragm control means for adjusting the aperture in the diaphragm in accordance with prevailing light conditions.

Conventional cameras of the above-described type in general have an operating switch and a release switch. The operating switch causes the diaphragm control means, and if required, other circuit components to be connected to the battery. Thus the operation of the operating switch causes the correct aperture to be set in the diaphragm. When the operating switch is not activated, all circuit components are disconnected from the battery. However, it is possible that the photographer forgets to open the operating switch after a series of pictures has been filmed. Since the electronic components still require a certain quiescent current even though this is small, it is possible that the batteries will be used up during the time the camera is idle. This possibility of course increases the longer the period between camera operation.

SUMMARY OF THE INVENTION

It is an object of the present invention to furnish a motion picture camera in which the photographer operates only a single operating switch both for connecting the components to the battery and for activating the film transport.

The present invention is a motion picture camera having film, film transport means for transporting said film, a diaphragm having an aperture, diaphragm control means for adjusting the size of said aperture, and a battery. It comprises a main operating switch for directly connecting the film transport means and the diaphragm control means to the battery upon activation of said single operating switch. Electronic switch means are connected to the film transport means for energizing said film transport means only in response to a control signal. Means are provided for furnishing said control signal only following the operation of the diaphragm control means. The energization of the film transport is therefore delayed until after the initial diaphragm adjustment has been completed.

The above-described apparatus has the disadvantage that the photographer may have the impression that the camera is inoperative, when the film transport does not start immediately upon activation of the single operating switch. In accordance with the present invention, indicator means are provided which may be visible through the view finder and which furnish an indicator signal indicative of the fact that the delay circuit is operative and therefore indicative of the fact that the camera is properly operative.

It should also be noted that the present invention offers the advantage that a blurring of the first few frames which often takes place in the standard camera since the first few frames are generally taken during the operation of the release contact is avoided. Further, since the adjustment time required for the diaphragm is very small, the delay time between the actual activation of the contact and the start of the film transport is short.

In a particularly preferred embodiment of the present invention the delay time is variable and depends directly upon the time interval required for adjustment of the aperture of the diaphragm. In known types of motion picture cameras, the diaphragm control means include a bridge circuit which is unbalanced when the aperture size is not correct for the prevailing light conditions. This unbalanced signal from the bridge circuit causes the generation of a diaphragm adjustment signal which, in turn, initiates the operation of a stepmotor in one of the other of two directions, depending upon the direction or unbalance of the bridge circuit. The diaphragm adjustment signal is thus present during the operation of the diaphragm control means. When used in conjunction with this type of camera, the present invention calls for control switch means which are connected in series with the film transport means and which are conductive only upon receipt of a control signal. The control signal is furnished by a NAND-gate having a first input connected to receive the diaphragm adjustment signal and a second input connected to the common point of the electronic switch and the transport motor. The second input thus receives a "1" signal only when the electronic switch is blocked, that is at the start of the operation. The NAND-gate has an output connected to the control input of the electronic switch. When "1" signals are present at both inputs, the output of the NAND-gate is a "0." Thus, since at the start of the operation, the electronic switch is non-conductive, the NAND-gate will have a "0" output until such time as the diaphragm adjustment signal goes to "0," that is until such time as the diaphragm has been properly adjusted. Thereafter, the NAND-gate will furnish the control signal causing the electronic switch to be conductive through the remainder of the filming.

In an alternate preferred embodiment the control signal is furnished by a timing circuit after a predetermined time interval following operation of the single operating switch. In this embodiment the control switch means include an electronic switch connected in series with the film transport motor, but operates not only to delay the activation of the motor but also to determine its speed. For the latter purpose, the base of the electronic switch is connected to the output of a speed selector circuit, the impedance of the electronic switch varying as a function of the current output of the speed selector circuit. In this embodiment the speed selector circuit is short-circuited thereby causing the electronic switch to assume a substantially infinite impedance until such time as the timing circuit furnishes the control signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
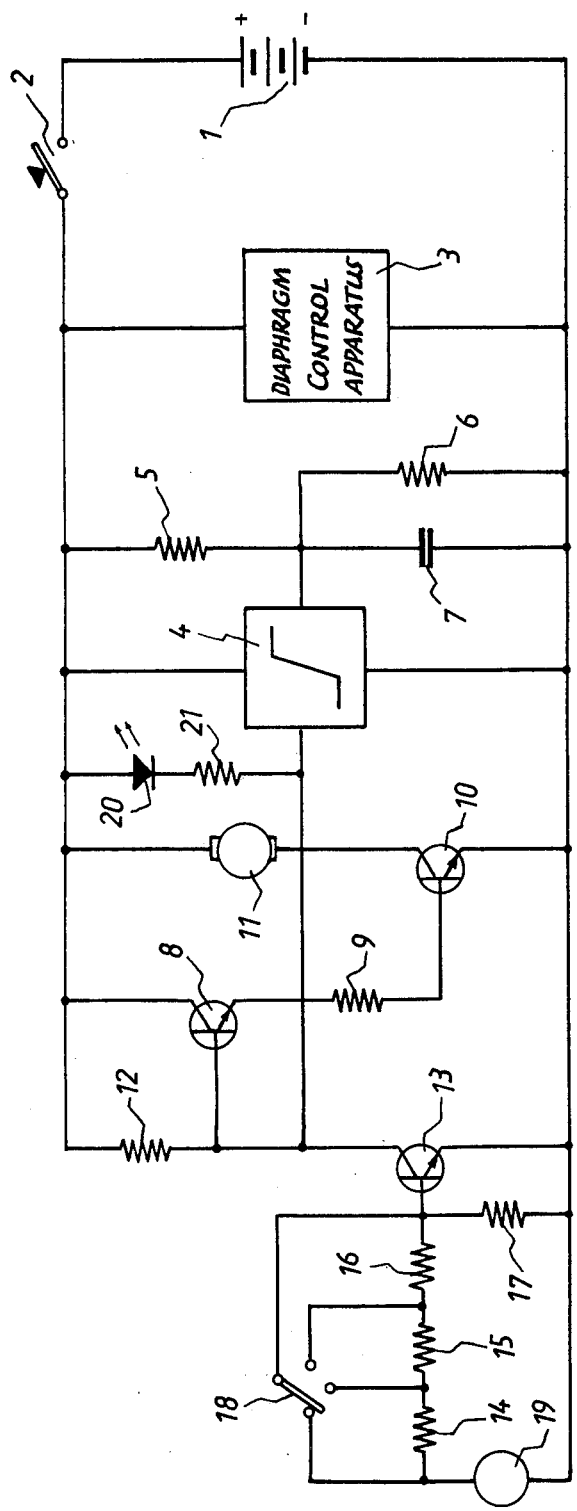
FIG. 1 shows the first embodiment of the present invention.

A preferred embodiment of the present invention will now be described with reference to the drawing.

Referring first to FIG. 1, reference numeral 1 denotes a voltage source, that is a battery, which is connected to the remainder of the circuitry by means of a single operating switch 2. Diaphragm control means are denoted by reference numeral 3 and comprise all the circuitry and apparatus required to adjust the size of the aperture of the diaphragm in accordance with the prevailing light conditions. The circuit in itself does not form a part of the present invention and is therefore not described in detail here. A bistable stage 4 is also provided. The input of the bistable stage 4 is connected to the tap of a voltage divider including resistors 5 and 6 and a capacitor 7 connected in parallel with resistor 6. The resistance of resistor 6 is large compared to that of resistor 5. The output of the bistable stage 4 is connected to the base of a transistor 8 into whose emitter circuit is connected a resistor 9. The other terminal of resistor 9 is connected to the base of transistor 10 whose emitter-collector circuit is connected in series with a motor 11 constituting film transport means. Motor 11 in a preferred embodiment is a DC motor. The base of transistor 8 is also connected to a voltage divider which comprises a resistor 12 and emitter-collector circuit of a transistor 13. The base of transistor 13 is connected to resistors 14, 15, 16 and 17, one or more of these resistors becoming effective depending upon the position of a selector switch 18. The driving voltage for this circuit, which is a speed control circuit for the film transport motor, is derived from the output of a tachometer 19. Bistable stage 4, and components 8-19 are herein referred to as control switch means, transistor 10 constituting an electronic switch, components 13-19 constituting speed selector means, with transistor 13 being referred to as the output transistor of the speed selector means. Circuit components 8, 9 and 12 constitute the circuit means interconnected between the output transistor and the electronic switch means.

The above-described apparatus operates as follows:

The diaphragm control means 3 are energized immediately upon closing of switch 2. The size of the aperture of the diaphragm is therefore immediately adjusted in accordance with the prevailing light conditions. Under these conditions the bistable stage 4 is in the first stable state which is a state wherein its output transistor (not shown) is fully conductive and therefore short-circuits and emitter-collector circuit of transistor 10. Transistor 8 is therefore blocked causing transistor 10 to be blocked also. Motor 11 is thus deenergized. Upon closing of switch 2, the charging of capacitor 7 commences. After a predetermined time internal which is sufficiently long to allow proper adjustment of the diaphragm, the voltage across capacitor 7 exceeds the threshold voltage of the bistable stage 4 and this stage switches to the second stable state. The voltage required for this switching of the bistable stage is herein referred to as the control signal. Upon application of this control signal the output transistor of bistable stage 4 becomes blocked, freeing the emitter-collector circuit of transistor 13. Transistor 8 then becomes conductive in accordance with the current furnished by transistor 13. This causes transistor 10 to become conductive also, again to the extent determined by the current furnished by transistor 13 which in turn depends upon the position of selector switch 18. DC motor 11 becomes energized and the film transport commences.

While bistable stage 4 is in the first stable state, a light-emitting diode 20 (one embodiment of indicator means) is energized via resistor 21. The signal from the light-emitting diode may be made viewable in the viewfinder and indicates to the photographer that the camera is in operating condition.

Figure 2:
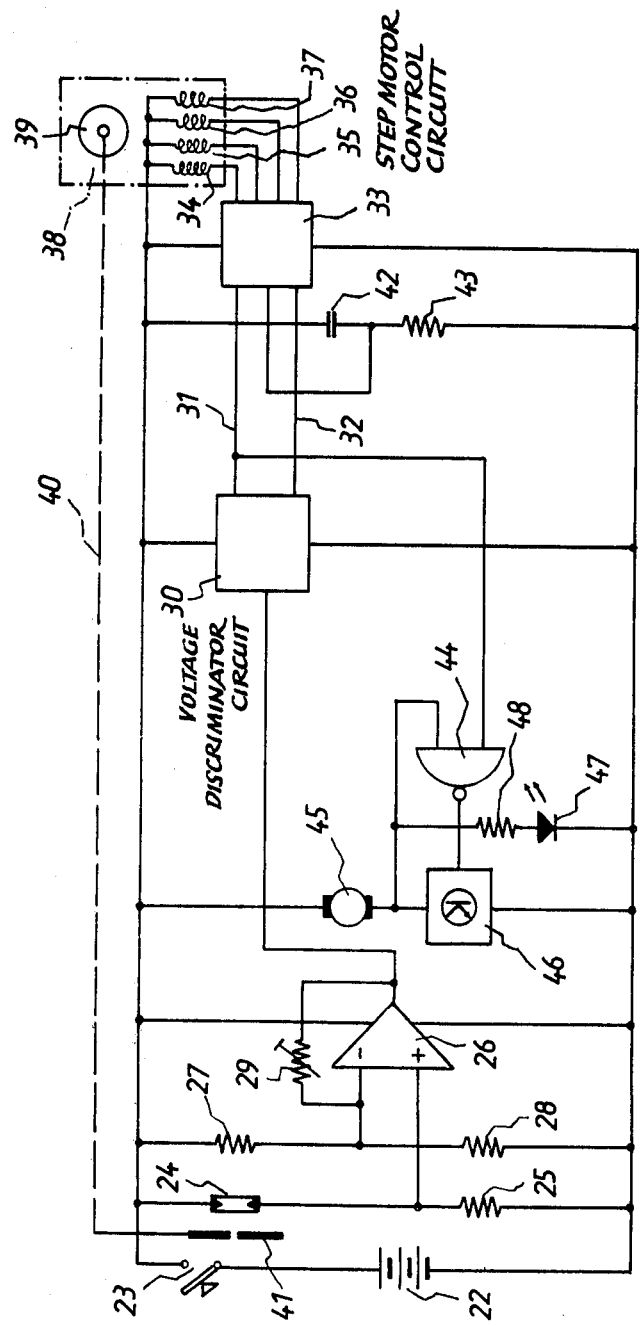
FIG. 2 a second embodiment.

In FIG. 2 the battery is denoted by reference numeral 22 and the single operating switch by reference numeral 23. The diaphragm control means are shown in somewhat greater detail and comprises a bridge circuit including a photoresistor 24, a resistor 25 connected in series with photoresistor 24 and a voltage divider including a resistor 27 and a resistor 28 connected in parallel with the voltage divider comprising photoresistor 24 and resistor 25. The common point of photoresistor 24 and resistor 25 is connected to the direct input of a differential amplifier 26, while the common point of resistors 27 and 28 is connected to the inverting input of this differential amplifier. The output of differential amplifier 26 is connected to the inverting input by an adjustable resistor 29. The output of differential amplifier 26 is connected to the input of a voltage discriminator stage 30 which has two output lines 31 and 32. The signal on line 31 is herein referred to as the diaphragm adjustment signal, while the signal on line 32 is a signal indicative of the direction in which the adjustment is to take place. The diaphragm adjustment signal, that is the signal on line 31 is a "1" signal present during the initial adjustment of the diaphragm. As is also shown in the above-mentioned U.S. patent, the armature 39 of motor 38 controls the diaphragm 41 through gearing 40, photoresistor 24 being positioned behind the diaphragm in the path of light towards the film. Also shown in FIG. 2 are a resistor 43 and a capacitor 42 which form part of the timing circuit for the pulse generator which is part of the motor control circuit 33.

Line 31 is connected to the first input of a NAND-gate 44, a preferred embodiment of logic circuit means. The second input of NAND-gate 44 is connected to the common point of motor 45 and electronic switch 46. The control electrode of the electronic switch 46 is connected to the output of NAND-gate 44. A light-emitting diode 47 in series with a resistor 48 are connected in parallel with electronic switch 46.

The above-described apparatus operates as follows:

Let it be assumed that, upon closure of switch 23, the bridge circuit of the diaphragm control means is unbalanced. A "1" signal will therefore appear on line 31. Since electronic switch 46 is blocked, the tap between motor 45 and switch 46 also carries a "1" signal. Thus a "0" signal appears at the output of NAND-gate 44 which causes electronic switch 46 to remain blocked. Only when the aperture of the diaphragm has been adjusted to the correct size does the "1" signal on line 31 disappear causing the output of NAND-gate 44 to become a "1" signal. Electronic switch 46 thus becomes conductive. The voltage at the common point between motor 45 and switch 46 becomes a "0" signal. This does not affect the output of NAND-gate 44 at all. However, if the available light changes during the time that a sequence of pictures is being taken, and the signal on line 31 again becomes a "1" signal, the signal at the output of NAND-gate 44 will still remain a "1" signal because of the "0" signal on its second input. Thus switch 46 remains in the conductive state causing the transport motor 45 to remain energized, independent of changes is available light and independent of the adjustment of the diaphragm resulting in accordance therewith. To summarize, electronic switch 46 is only blocked if, at the start of the filming, motor 45 is deenergized. Once it has been energized, it will not again be deenergized until switch 23 is again opened.

Before electronic switch 46 becomes conductive, the light-emitting diode 47 indicates to the photographer that adjustment processes are still taking place in the camera and that therefore motor 45 is not as yet energized. It will be noted that the photographer need have no doubt as to the operability of the camera even if motor 45 is not energized immediately upon closing of switch 23. In order to differentiate the indication by light-emitting diode 47 from other indicators, it is possible to connect the diode into the output circuit of an oscillator which is energized by the potential drop across switch 46 when this switch is in the blocked state.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motion picture camera having film, a battery, film transport means for transporting said film, a diaphragm having an aperture, and electronically energized diaphragm control means for adjusting said aperture in accordance with light available for exposure, apparatus for automatically energizing said film transport means following the operation of said diaphragm control means in response to external activation of a single operating switch, comprising, in combination, connecting means for directly connecting said film transport means and said diaphragm control means to said battery upon external operation of said single operating switch; control switch means connected to said film transport means for blocking the energization of said film transport means until receipt of a control signal; and delay circuit means for furnishing said control signal to said control switch means only after completion of the operation of said diaphragm control means.

2. Apparatus as set forth in claim 1, wherein said camera has a view finder; further comprising indicator means visible in said view finder and connected to said delay circuit means for furnishing a visual indication indicative of the operation of said delay circuit means to the photographer.

3. Apparatus as set forth in claim 1, wherein said delay circuit means comprise a timing circuit for furnishing said control signal to said control switch means a predetermined time period following energization of said timing circuit means, and means for directly connecting said timing circuit means to said battery upon external operation of said single operating switch.

4. Apparatus as set forth in claim 3, wherein said predetermined time interval is at least equal to the maximum time required for operation of said diaphragm control means.

5. Apparatus as set forth in claim 1, wherein said diaphragm control means comprise means for furnishing a diaphragm adjustment signal when the size of said aperture of said diaphragm differs from a desired size; and wherein said delay circuit means comprise logic circuit means connected to said means for furnishing a diaphragm adjustment signal and said control switch means for furnishing said control signal to said control switch means only in the absence of said diaphragm adjustment signal.

6. In a motion picture camera having film, a battery, film transport means for transporting said film, a diaphragm having an aperture, and electronically energized diaphragm control means for adjusting said aperture in accordance with light available for exposure, apparatus for automatically energizing said film transport means following the operation of said diaphragm control means in response to external activation of a single operating switch, comprising, in combination, connecting means for directly connecting said film transport means and said diaphragm control means to said battery upon external operation of said single operating switch; control switch means connected to said film transport means for blocking the energization of said film transport means until receipt of a control signal; and delay circuit means for furnishing said control signal to said control switch means only after completion of the operation of said diaphragm control means, wherein said delay circuit means comprise a timing circuit for furnishing said control signal to said control switch means a predetermined time period following energization of said timing circuit means, and means for directly connecting said timing circuit means to said battery upon external operation of said single operating switch, wherein said control switch means comprise a bistable stage switching from a first to a second stable state in response to said control signal, an electronic switch connected in series with said film transport means, and additional circuit means interconnected between said bi-stable stage and said electronic switch for maintaining said electronic switch in a non-conductive state when said bistable stage is in said first stable state and for maintaining said electronic switch in a conductive state thereby energizing said film transport means when said bistable stage is in said second stable state.

7. Apparatus as set forth in claim 6, wherein said camera has speed selector means for selecting the transport speed of said film transport means; wherein said speed selector means has an output transistor for furnishing an output current varying as a function of the so-selected speed; and wherein said additional circuit means further comprise circuit means interconnected between said output transistor and said electronic switch for varying the conductivity of said electronic switch as a function of said output current.

8. Apparatus as set forth in claim 7, wherein said circuit means interconnected between said output transistor and said electronic switch comprise means for blocking said electronic switch thereby preventing energization of said film transport means when said output transistor is short-circuited.

9. Apparatus as set forth in claim 6, further comprising indicator means connected to said bistable stage for furnishing an indicator output signal only when said bistable stage is in said first stable state.

10. In a motion picture camera having film, a battery, film transport means for transporting said film, a diaphragm having an aperture, and electronically energized diaphragm control means for adjusting said aperture in accordance with light available for exposure, apparatus for automatically energizing said film transport means following the operation of said diaphragm control means in response to external activation of a single operating switch, comprising, in combination, connecting means for directly connecting said film transport means and said diaphragm control means to said battery upon external operation of said single operating switch; control switch means connected to said film transport means for blocking the energization of said film transport means until receipt of a control signal; and delay circuit means for furnishing said control signal to said control switch means only after completion of the operation of said diaphragm control means, wherein said diaphragm control means comprise means for furnishing a diaphragm adjustment signal when the size of said aperture of said diaphragm differs from a desired size; and wherein said delay circuit means comprise logic circuit means connected to said means for furnishing a diaphragm adjustment signal and said control switch means for furnishing said control signal to said control switch means only in the absence of said diaphragm adjustment signal, wherein said control switch means comprise an electronic switch connected in series with said film transport means at a common point; and wherein said logic circuit means comprise a NAND-gate having a first input connected to receive said diaphragm adjustment signal, a second input connected to said common point, whereby said second input receives a "1" signal only when said electronic switch is in the non-conductive state, and a NAND-gate output, for furnishing said control signal at said NAND-gate output in response to the absence of a "1" signal at said first or said second input, whereby said control signal is furnished to said control switch means thereby energizing said film transport means at all times during the activation of said single operating switch following initial adjustment of said aperture of said diaphragm.

11. Apparatus as set forth in claim 10, further comprising indicator means connected in parallel with said electronic switch for furnishing an indicator signal only when said electronic switch is in the blocked state.

* * * * *